United States Patent
Hung

(10) Patent No.: US 11,953,956 B2
(45) Date of Patent: Apr. 9, 2024

(54) REPLACEABLE FRAME ASSEMBLY FOR ACCOMMODATING EXPANSION CARD MODULE AND ELECTRONIC DEVICE HAVING THE SAME

(71) Applicant: LANNER ELECTRONICS INC., New Taipei (TW)

(72) Inventor: Shih-Tai Hung, New Taipei (TW)

(73) Assignee: LANNER ELECTRONICS INC., New Taipei (TW)

( * ) Notice: Subject to any disclaimer, the term of this patent is extended or adjusted under 35 U.S.C. 154(b) by 206 days.

(21) Appl. No.: 17/730,564

(22) Filed: Apr. 27, 2022

(65) Prior Publication Data
US 2023/0099973 A1 Mar. 30, 2023

(30) Foreign Application Priority Data
Sep. 24, 2021 (TW) ................................ 110135668

(51) Int. Cl.
*G06F 1/18* (2006.01)
*G06F 13/40* (2006.01)
*G06F 13/42* (2006.01)

(52) U.S. Cl.
CPC .......... *G06F 1/186* (2013.01); *G06F 13/4063* (2013.01); *G06F 13/4282* (2013.01); *G06F 2213/0026* (2013.01)

(58) Field of Classification Search
CPC ... G06F 1/186; G06F 13/4063; G06F 13/4282
See application file for complete search history.

(56) References Cited

U.S. PATENT DOCUMENTS

| | | | |
|---|---|---|---|
| 5,740,020 A | 4/1998 | Palatov | |
| 10,359,861 B2 * | 7/2019 | Yamada | ................ G06F 1/1658 |
| 11,818,855 B2 * | 11/2023 | Li | ........................ H05K 5/0282 |
| 2015/0195943 A1 | 7/2015 | Fricker | |

FOREIGN PATENT DOCUMENTS

| | | |
|---|---|---|
| CN | 202817429 U | 3/2013 |
| TW | M435764 U | 8/2012 |
| WO | 9933377 | 7/1999 |

OTHER PUBLICATIONS

Search Report for Taiwan counterpart application TW110135688, date Sep. 24, 2022.
(English translation) Search Report for Taiwan counterpart application TW110135688, date Sep. 24, 2022.

\* cited by examiner

*Primary Examiner* — Mukundbhai G Patel

(57) ABSTRACT

A replaceable frame assembly is disclosed, which comprises: a base plate, a first fixing unit, a second fixing unit, a front panel, at least one first electrical connection interface, a second electrical connection interface, a third electrical connection interface, and a fixation plate. The replaceable frame assembly is adopted for accommodating an expansion card module, and can be disposed in a case of an electronic device. After being disposed in the case, an electrical connection end of the first electrical connection interface is embedded into an electrical slot that is disposed on a main board, such that the expansion card module communicates with the main board through the second electrical connection interface, the third electrical connection interface, the first electrical connection interface, and the electrical slot, thereby making the expansion card module become a functional electronic module of the electronic device.

15 Claims, 12 Drawing Sheets

REPLACEABLE FRAME ASSEMBLY FOR ACCOMMODATING EXPANSION CARD MODULE AND ELECTRONIC DEVICE HAVING THE SAME

BACKGROUND OF THE INVENTION

1. Field of the Invention

The present invention relates to the technology field of electronic devices, and more particularly to a replaceable frame assembly for accommodating an expansion card module.

2. Description of the Prior Art

There are a variety of computer devices applied in modern life, e.g., personal computer, server computer, single board computer, embedded system computer, industrial computer, in-vehicle infotainment system, security monitoring system, and gaming computer. For facilitating the module expansion and the preventive maintenance of the computer device, the computer device is commonly designed to have a main board that is provided with chipset, I/O interface and necessary electronic components thereon. Moreover, there is at least one expansion slot disposed on the main board for receiving the extension board. For example, U.S. Pat. No. 10,762,025B1 has disclosed a server system having multiple extension boards.

Engineers skilled in computer science certainly know that, PCIe card is one kind of extension board, and conventionally comprises a circuit board assembly and a mounting bracket. As described in more detail below, the circuit board assembly comprises a circuit board, and there is an electrical connection member (i.e., gold finger) formed on one side of the circuit board. When adding a new PCIe card to the computer device, it needs to firstly make the gold finger of the PCIe card be received by a PCIe slot of the main board, and subsequently to make the mounting bracket of the PCIe card be out of an opening of the computer device's case. Eventually, after a screw is adopted for fastening the mounting bracket onto the case, the installing of the PCIe card for the computer device is completed.

Moreover, engineers skilled in computer science certainly know that, sound card, graphics card, network interface card, video capture card, and audio capture card are all provided in the form of PCIe card. As introduced in more detail below, there have various types of PCIe cards been designed and manufactured in different sizes. For example, solid-state drives (SSDs) that come in the form of PCIe cards often use HHHL (half height, half length) and FHHL (full height, half length) to describe the physical dimensions of the card. Clear definitions about the sizes of different PCIe cards are summarized in following Table 1.

TABLE 1

| PCIe card type | Dimensions height × length × width | |
| --- | --- | --- |
| | (mm) | (in) |
| Full-Length | 111.15 × 312.00 × 20.32 | 4.376 × 12.283 × 0.8 |
| Half-Length | 111.15 × 167.65 × 20.32 | 4.376 × 6.600 × 0.8 |
| Low-Profile | 68.90 × 167.65 × 20.32 | 2.731 × 6.600 × 0.8 |

Therefore, it is imaginable that the opening of the computer device's case mentioned above must to be particularly designed, so as to make the size of the opening fits the PCIe card perfectly. In other words, there is a need to form multiple openings with different sizes on the computer device's case, such that any one type of PCIe card all can be added to the computer device. However, this solution can be easily implemented in personal desktop computer, but fails to be implemented in a specific computer device like server computer, single board computer, embedded system computer, industrial computer, and in-vehicle infotainment system.

In view of this fact, inventors of the present application have made great efforts to make inventive research and eventually provided a replaceable frame assembly for accommodating an expansion card module.

SUMMARY OF THE INVENTION

The primary objective of the present invention is to disclose a replaceable frame assembly is disclosed, which comprises: a base plate, a first fixing unit, a second fixing unit, a front panel, at least one first electrical connection interface, a second electrical connection interface, a third electrical connection interface, and a fixation plate. The replaceable frame assembly is adopted for accommodating an expansion card module, and can be disposed in a case of an electronic device. After being disposed in the case, an electrical connection end of the first electrical connection interface is embedded into an electrical connection slot that is disposed on a main board, such that the expansion card module communicates with the main board through the second electrical connection interface, the third electrical connection interface, the first electrical connection interface, and the electrical connection slot, thereby making the expansion card module become a functional electronic module of the electronic device.

For achieving the primary objective mentioned above, the present invention provides an embodiment of the replaceable frame assembly, comprising:

a base plate;
a first fixing unit, being disposed on a front side of the base plate, and comprising at least one front panel connecting members and a plug receiving member;
a second fixing unit, being disposed on a first lateral side of the base plate, and comprising at least one fixation plate connecting members;
a front panel, being connected to the front side of the base plate through the at least one front panel connecting members, and having a first opening;
at least one first electrical connection interface, being disposed on the base plate, and being positioned near a rear side of the base plate;
a second electrical connection interface, being disposed on the base plate, and being positioned near a second lateral side of the base plate;
a third electrical connection interface, being connected between the second electrical connection interface and the at least one first electrical connection interface; and
a fixation plate, being connected to the first lateral side of base plate through the at least one fixation plate connecting members, and there being a fixing member formed on a front side of the fixation plate, such that the fixing member passes through the first opening;
wherein in case of an expansion card module consisting of a circuit board assembly and a mounting bracket being disposed on the base plate, an electrical connection member of the circuit board assembly being connected with the second electrical connection interface, thereby being further coupled to said first electrical connection interface through the second electrical connection interface and the third electrical connection interface;

wherein a plug member of the mounting bracket being inserted into the plug receiving member, and a fastening member of the mounting bracket being exposed out of the front panel through the first opening, such that the fastening member and the fixing member are allowed to be attached to each other by a threaded fastener, thereby making the expansion card module be positioned on the base plate steadily.

In one embodiment, there are a plurality of propping members formed on one surface of the fixation plate, and the plurality of propping members prop against a side of the expansion card module after the fastening member and the fixing member are attached to each other by the threaded fastener.

In one embodiment, there is further a second opening formed on the front panel, and the mounting bracket is provided with a third opening thereon, such that a signal transmission interface of the expansion card module is exposed out of the front panel through the second opening and the third opening.

In one embodiment, said first electrical connection interface is a first bridge board having a first electrical connection end and a second electrical connection end. Moreover, in case of the replaceable frame assembly is integrated into a case of an electronic device, the second electrical connection end of said first electrical connection interface is received by an electrical connection slot of a main board in the case.

In one embodiment, the second electrical connection interface comprises a second bridge board having one electrical connection end and an electrical connection slot that is disposed on the second bridge board.

In one embodiment, the second lateral side of the base plate is formed with a notch thereon, and the third electrical connection interface comprises:

a first electrical connector, being connected with the electrical connection end of the second bridge board;

at least one second electrical connector, wherein said second electrical connector is connected with the first electrical connection end of the first bridge board; and at least one ribbon cable, being connected between the at least one second electrical connector and the first electrical connector, and passing through the notch.

In one practicable embodiment, a disposing number of said first electrical connection interface on the based plate is 1, such that the first electrical connection end and the second electrical connection end of the first bridge board and the electrical connection end of the second bridge board are all a PCIe-X16 gold finger, and the electrical connection slot is a PCIe-X16 slot.

In another one practicable embodiment, a disposing number of said first electrical connection interface on the based plate is 2, such that the first electrical connection end and the second electrical connection end of the first bridge board are both a PCIe-X8 gold finger, the electrical connection end of the second bridge board is a PCIe-X16 gold finger, and the electrical connection slot is a PCIe-X16 slot.

In one embodiment, said replaceable frame assembly further composes:

a connection plate, being connected with the second fixing unit;

a first plate, being connected to the connection plate by one side thereof, and being provided with at least one slot opening thereon;

a second plate, being provided with at least one screw hole thereon, such that the second plate is combined with the first plate after making a threaded fastener pass through said slot opening and then be screwed into said screw hole; and a fixation block, being connected to the second plate, and having a receiving groove;

wherein after the expansion card module is disposed on the base plate, the second plate is allowed to be moved horizontally by pushing said threaded fastener to slide along said slot opening, so as to make a lateral side of the expansion card module be embedded into the receiving groove of the fixation block;

wherein after the expansion card module is embedded into the receiving groove by one lateral side thereof, the second plate is allowed to be fixed by screwing said threaded fastener tightly.

Moreover, the present invention simultaneously discloses an electronic device, which has a case accommodating a main board therein, and the case has an insertion opening. Said electronic device is characterized in that, further having the replaceable frame assembly 1 described above.

In one embodiment, said electronic device is selected from a group consisting of desktop computer, server computer, single board computer, embedded system computer, industrial computer, in-vehicle infotainment system, security monitoring system, and gaming computer.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a replaceable frame assembly for accommodating an expansion card module according to the present invention, embodiments of the present invention will be described in detail with reference to the attached drawings hereinafter.

First Embodiment

Figure 1:
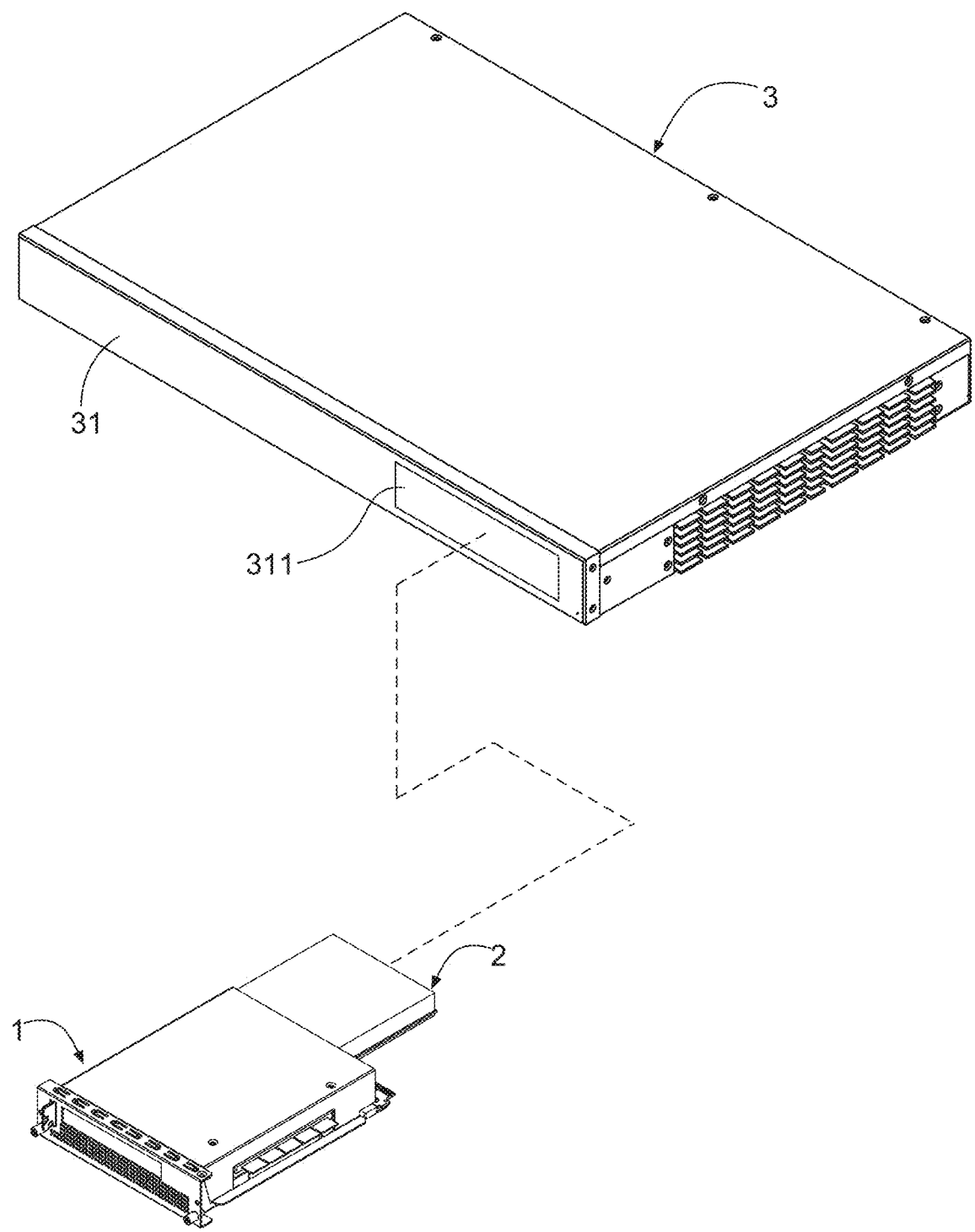
FIG. 1 shows a stereo diagram of an electronic device having a replaceable frame assembly according to the present invention.

With reference to FIG. 1, there is shown a stereo diagram of an electronic device having a replaceable frame assembly according to the present invention. As FIG. 1 shows, the present invention discloses a replaceable frame assembly 1 for accommodating an expansion card module 2, and the replaceable frame assembly 1 is allowed to be inserted into a case 31 of the electronic device 3 through an insertion opening 311 that is formed on a front side of the case 31. After being disposed in the case 31, the replaceable frame assembly 1 electrically connected to a main board in the case 31, such that the expansion card module 2 communicates with the main board, and therefore becomes a functional electronic module of the electronic device 3. In one embodiment, said electronic device 3 can be desktop computer, server computer, single board computer, embedded system computer, industrial computer, in-vehicle infotainment system, security monitoring system, or gaming computer.

Figure 2A:
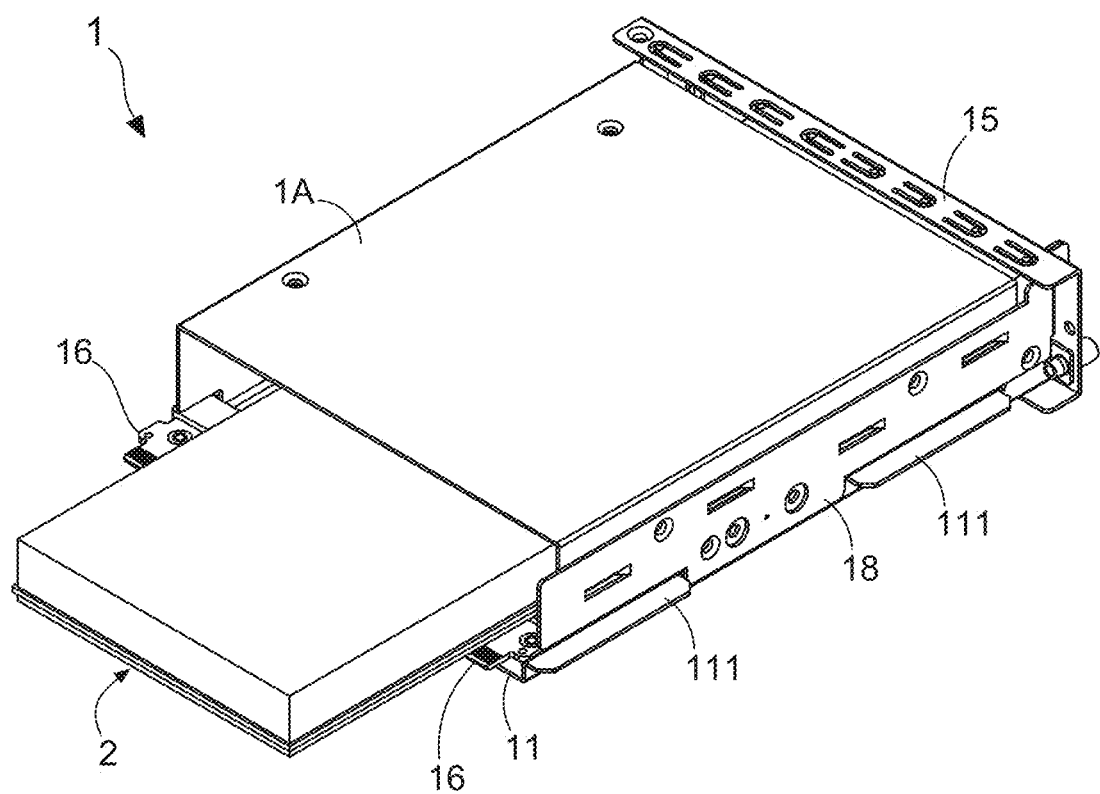
FIG. 2A shows a first stereo diagram of the replaceable frame assembly according to the present invention.
Figure 2B:
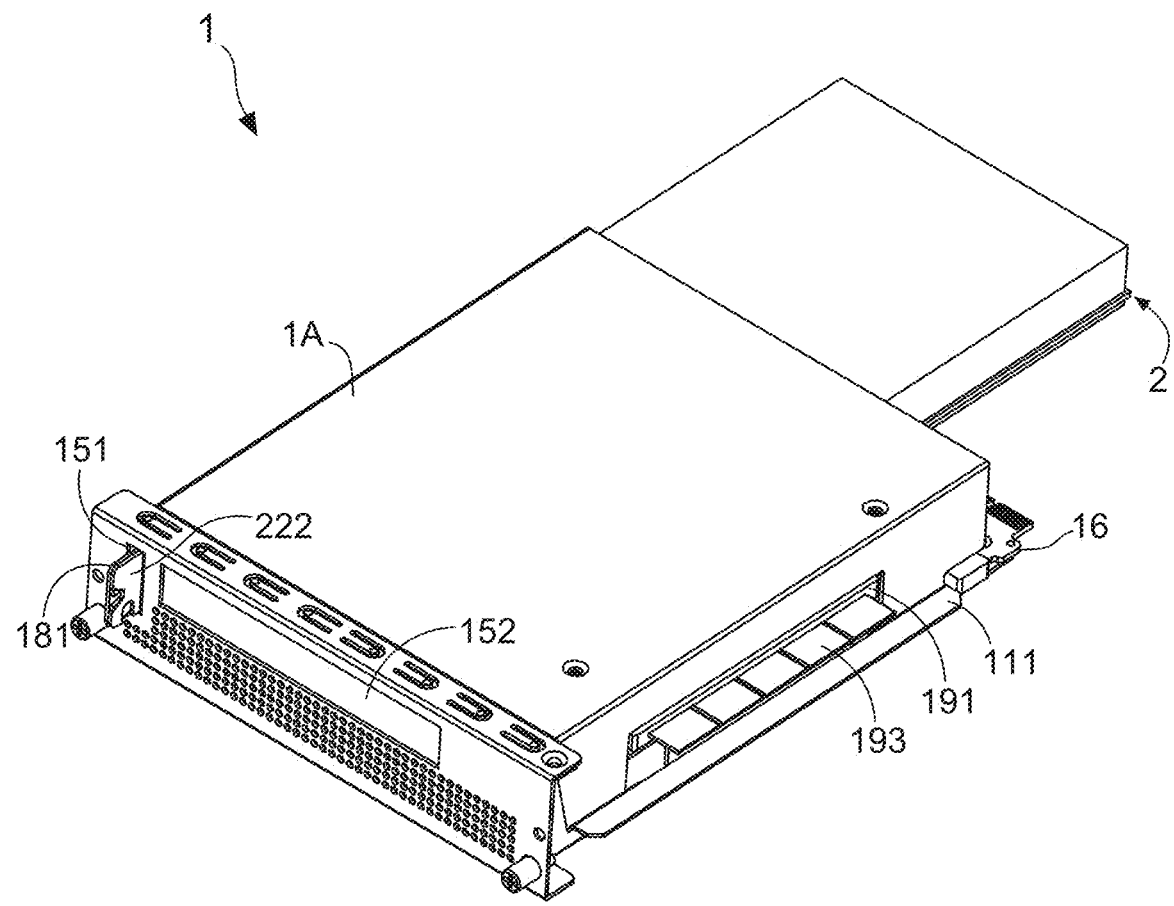
FIG. 2B shows a second stereo diagram of the replaceable frame assembly according to the present invention.
Figure 3A:
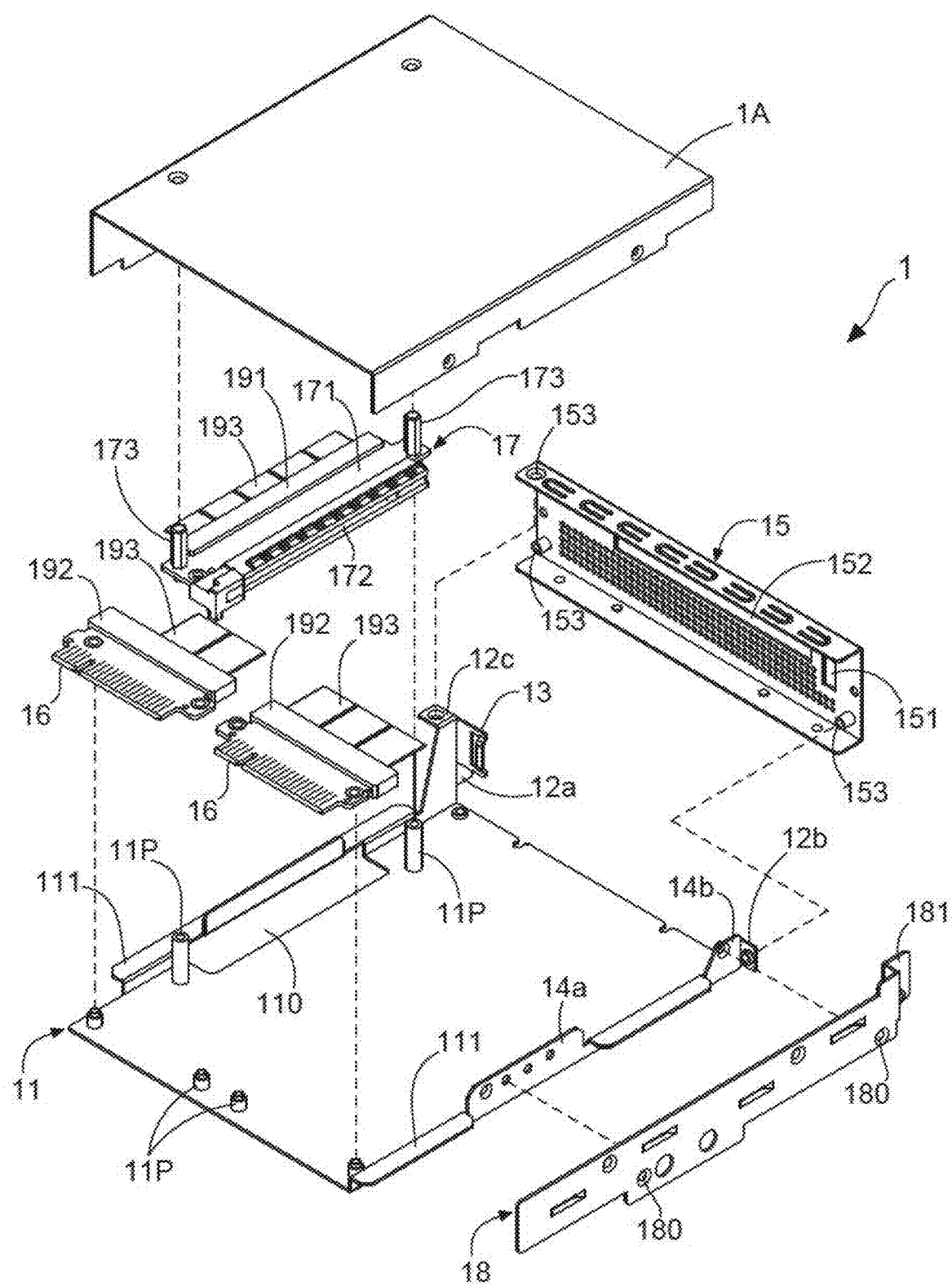
FIG. 3A shows a first exploded view of the replaceable frame assembly according to the present invention.
Figure 3B:
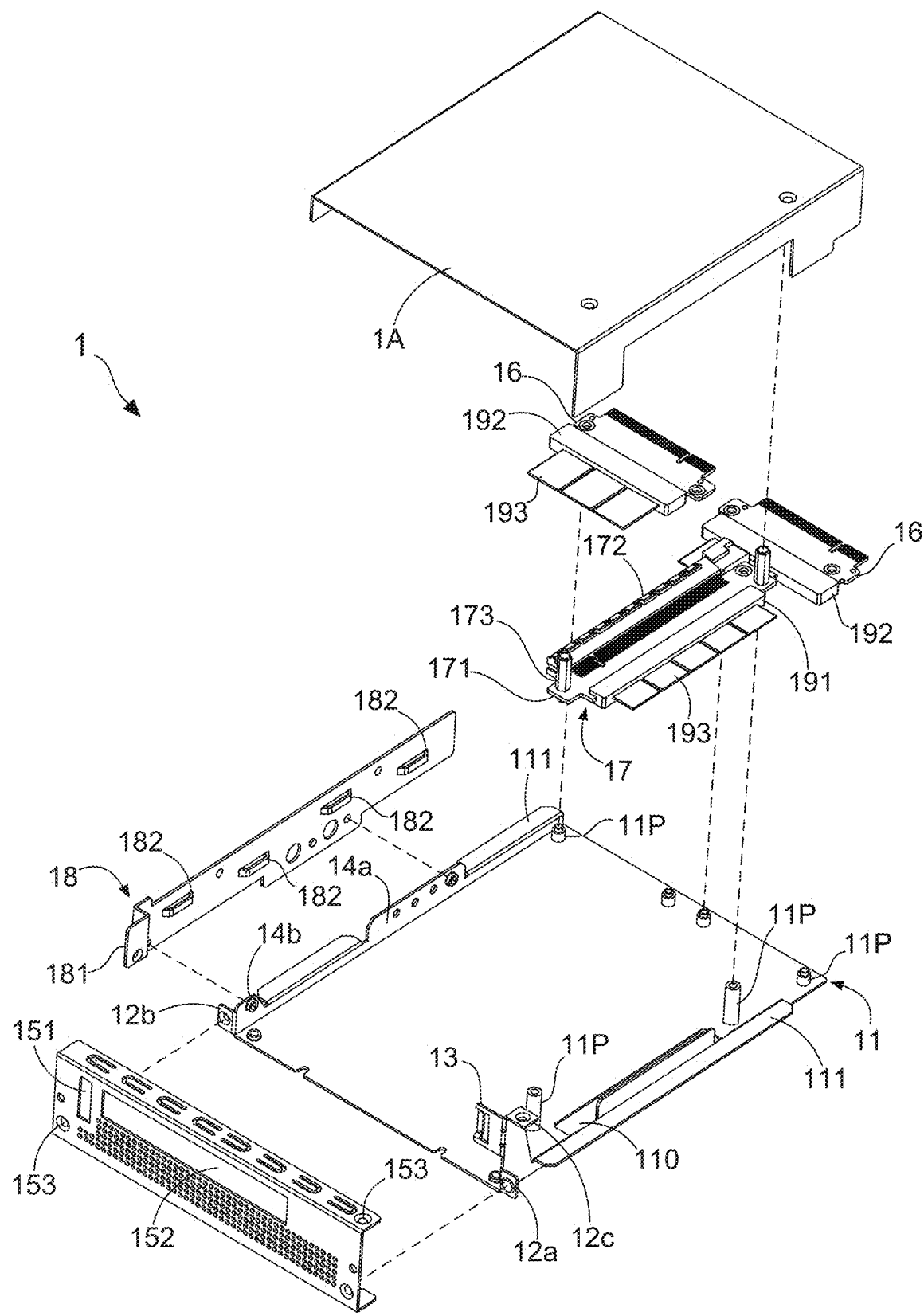
FIG. 3B shows a second exploded view of the replaceable frame assembly according to the present invention.

FIG. 2A and FIG. 2B illustrate a first stereo diagram and a second stereo diagram of the replaceable frame assembly 1 according to the present invention. Moreover, FIG. 3A and FIG. 3B show a first exploded view and a second exploded view of the replaceable frame assembly 1. According to the present invention, the replaceable frame assembly 1 comprises: a base plate 11, a first fixing unit comprising a first front panel connecting member 12a, a second front panel connecting member 12b, a third front panel connecting member 12c, and a plug receiving member 13, a second fixing unit comprising a first fixation plate connecting member 14a and a second fixation plate connecting member 14b, a front panel 15, at least one first electrical connection interface 16, a second electrical connection interface 17, a third electrical connection interface (191, 192, 193), and a fixation plate 18b. As described in more detail below, the first front panel connecting member 12a, the second front panel connecting member 12b, the third front panel connecting member 12c, and the plug receiving member 13 (i.e., said first fixing unit) are all disposed on a front side of the base plate 11, and the first fixation plate connecting member 14a and the second fixation plate connecting member 14b, (i.e., said second fixing unit) are disposed on a first lateral side of the base plate 11. On the other hand, the front panel 15 is designed to have a first opening 151, a second opening 152 and multiple first screw holes 153. By such arrangements, the multiple first screw holes 153 and the three front panel connecting members (12a, 12b, 12c) are allowed to be connected to each other by three screws, thereby making the front panel 15 be attached to the front side of the base plate 11.

As FIG. 3A and FIG. 3B show, there are two first electrical connection interfaces 16 disposed on the base plate 11, and are positioned near a rear side of the base plate 11. Moreover, a second electrical connection interface 17 is disposed on the base plate 11, and is positioned near a second lateral side of the base plate 11. In one embodiment, said first electrical connection interface 16 is a first bridge board 16 having a first electrical connection end and a second electrical connection end. Therefore, in case of the replaceable frame assembly 1 being integrated into the case 31 of an electronic device 3, the second electrical connection end of said first electrical connection interface 16 is received by an electrical connection slot that is provided on the main board. On the other hand, the second electrical connection interface 17 comprises a second bridge board 171 having one electrical connection end and an electrical connection slot 172 that is disposed on the second bridge board 171. According to FIG. 3A and FIG. 3B, it is found that there are a plurality of supporting members 11P disposed on the base plate 11 for supporting the second bridge board 171 and the first bridge board 16. Moreover, the first lateral side and the second lateral side of the base plate 11 are both connected with at least one edge plate 111. It is imaginable that, the edge plates 111 work in combination with a guide unit (e.g., slide slot or slide rail) that is disposed in the case 31, thereby facilitating the replaceable frame assembly 1 be inserted into or took out from the case 31.

As described in more detail below, the second lateral side of the base plate 11 is formed with a notch 110 thereon, and the third electrical connection interface 19 comprises: a first electrical connector 191, at least one second electrical connector 192 and at least one ribbon cable 193. As FIG. 3A and FIG. 3B show, the first electrical connector 191 is connected with the electrical connection end of the second bridge board 171, and said second electrical connector 192 is connected with the first electrical connection end of the first bridge board 16. In other words, said second electrical connector 192 and said first electrical connection interface 16 have the same disposing number. For example, if the disposing number of said first electrical connection interface 16 on the based plate 11 is 1, the disposing number of said second electrical connector 192 is also 1. In such case, that the first electrical connection end and the second electrical connection end of the first bridge (interface) board 16 and the electrical connection end of the second bridge board 171 are all a PCIe-X16 gold finger, the electrical connection slot 172 is a PCIe-X16 slot, and the second electrical connector 192 and the first electrical connector 192 are both PCIe-X16 connector. However, if the disposing number of said first electrical connection interface 16 on the based plate 11 is 2, the disposing number of said second electrical connector 192 is also 2. In such case, the first electrical connection end and the second electrical connection end of the first bridge (interface) board 16 are both a PCIe-X8 gold finger, the electrical connection end of the second bridge board 171 is a PCIe-X16 gold finger, the electrical connection slot 172 is a PCIe-X16 slot, the second electrical connector 192 is a PCIe-X8 connector, and the first electrical connector 192 is a PCIe-X16 connector.

In addition, the at least one ribbon cable 193 is connected between the at least one second electrical connector 192 and the first electrical connector 191, and pass through the notch 110. As FIG. 3A and FIG. 3B show, there are multiple second screw holes 180 formed on the fixation plate 18, such that the multiple second screw holes 180 and the two fixation plate connecting members (14a, 14b) are allowed to be connected to each other by two screws, thereby making the fixation plate 18 be attached to the first lateral side of base plate 11. Moreover, there is a fixing member 181 formed on a front side of the fixation plate 18, and the fixing member 181 passes through the first opening 151 after the fixation plate 18 is connected to the first lateral side of base plate 11.

Figure 4A:
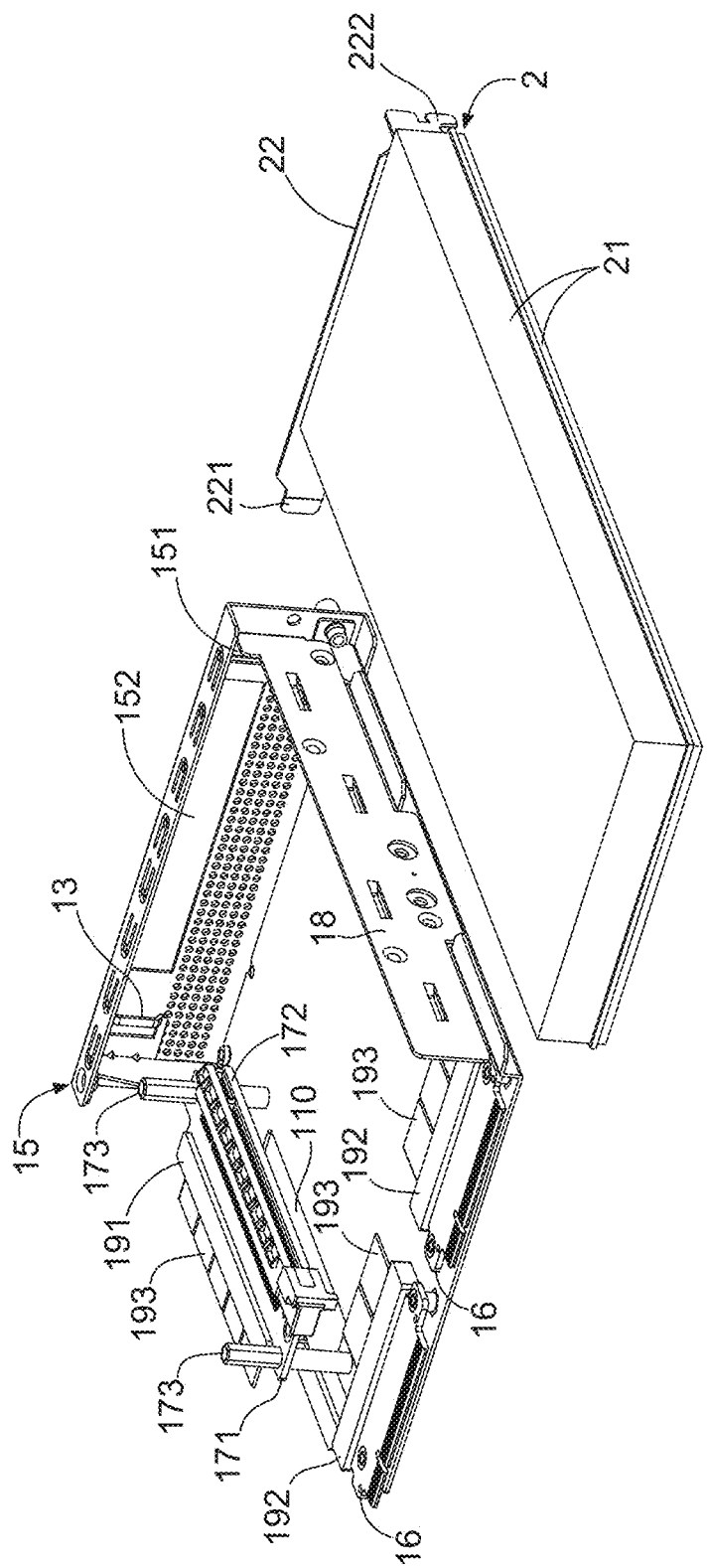
FIG. 4A shows a first stereo diagram of the replaceable frame assembly and an expansion card module.
Figure 4B:
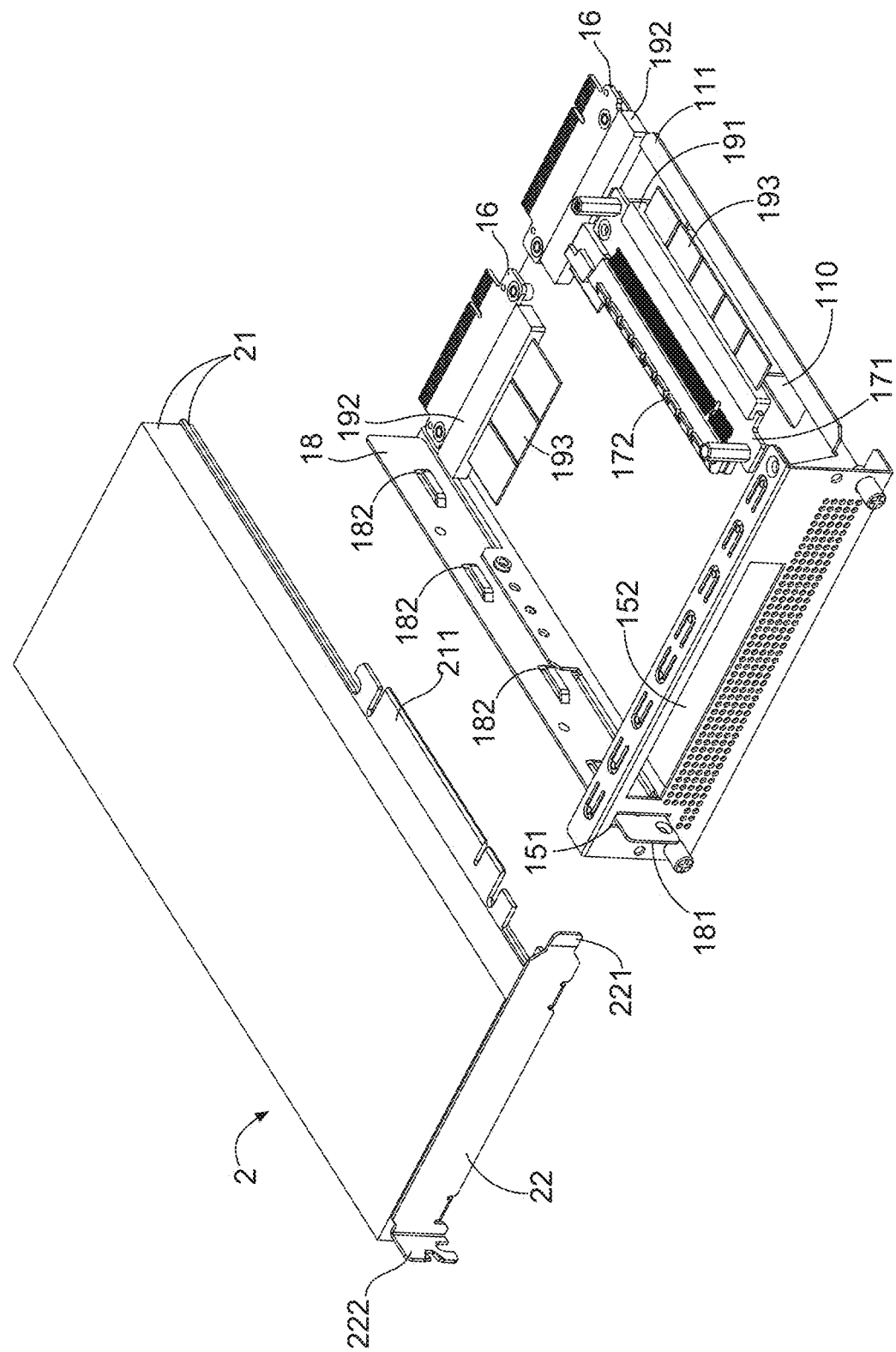
FIG. 4B shows a second stereo diagram of the replaceable frame assembly and the expansion card module.

FIG. 4A and FIG. 4B show a first stereo diagram and a second stereo diagram of the replaceable frame assembly 1 and an expansion card module 2. In common, an expansion card module 2 consists of a circuit board assembly 21 and a mounting bracket 22. According to FIG. 3A, FIG. 3B, FIG. 4A, and FIG. 4B, in case of the expansion card module 2 being disposed on the base plate 11, an electrical connection member 211 of the circuit board assembly 21 is connected with the electrical connection slot 172 of second electrical connection interface 17, thereby being further coupled to said first electrical connection interface 16 through the second electrical connection interface 17 and the third electrical connection interface (191, 192, 193).

Figure 5:
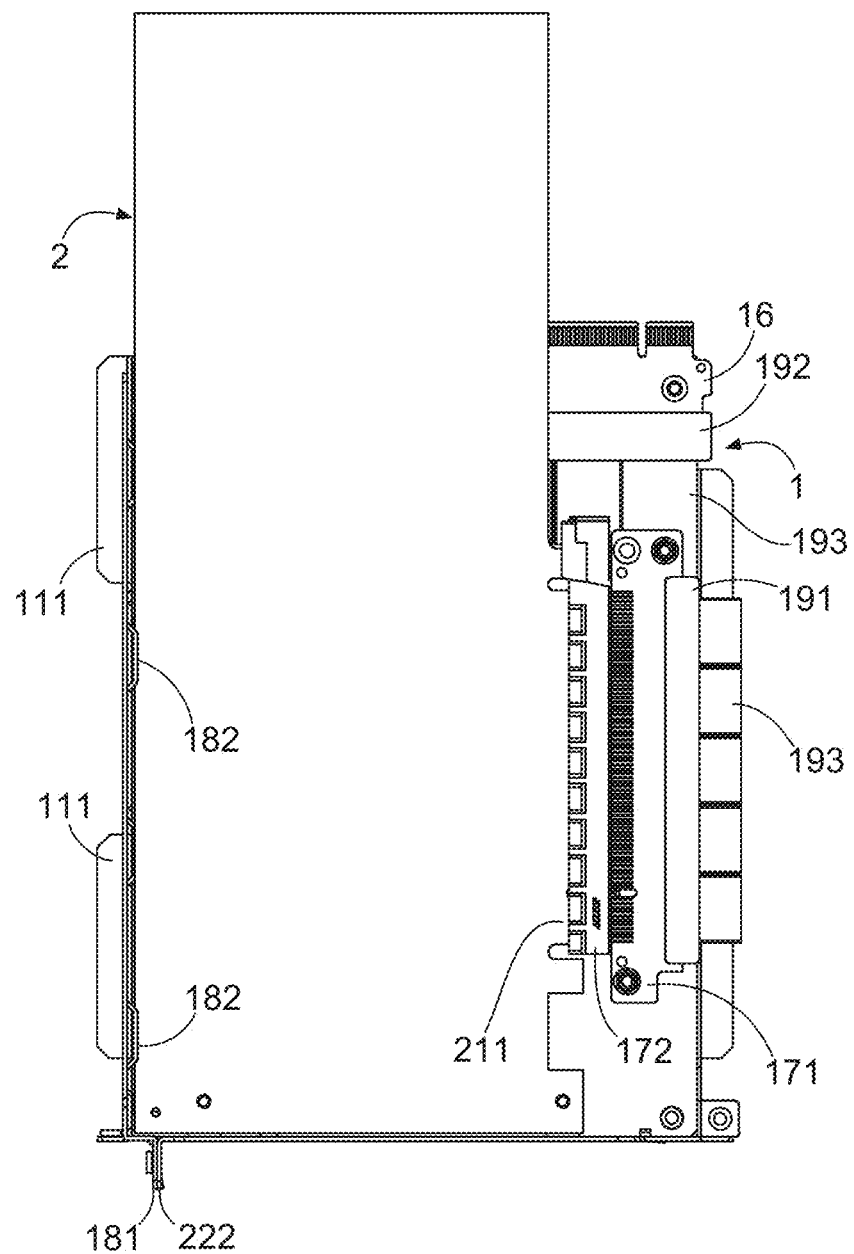
FIG. 5 shows a first top view of the replaceable frame assembly accommodating the expansion card module.

FIG. 5 shows a first top view of the replaceable frame assembly accommodating the expansion card module. As described in more detail below, when the expansion card module 2 is disposed on the base plate 11, a plug member 221 of the mounting bracket 22 is inserted into the plug receiving member 13, and a fastening member 222 of the mounting bracket 22 is exposed out of the front panel 15 through the first opening 151, such that the fastening member 222 and the fixing member 181 are allowed to be attached to each other by a threaded fastener, thereby making the expansion card module 2 be positioned on the base plate 11 steadily. Furthermore, there are a plurality of propping members 182 formed on one surface of the fixation plate 18, and the plurality of propping members 182 prop against a side of the expansion card module 2 after the fastening member 222 and the fixing member 181 are attached to each other by the threaded fastener.

In addition, there are multiple spacer members 173 disposed on the second bridge board 171, and the spacer members 173 and the fixation plate 18 are allowed to be connected with a cover 1A, such that the cover 1A is positioned over the base plate 11 to shield the expansion card module 2.

Second Embodiment

Figure 6:
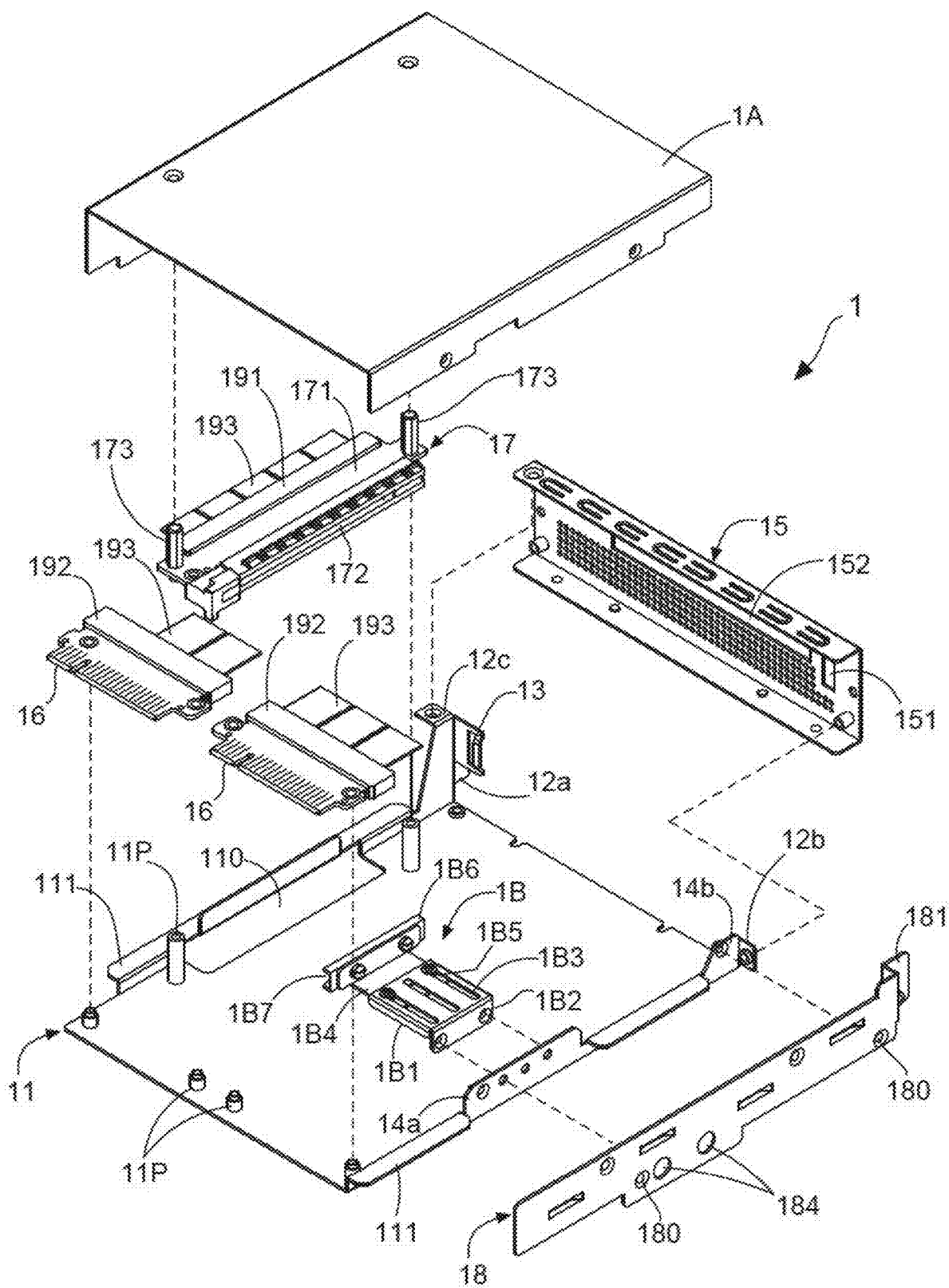
FIG. 6 shows a third exploded view of the replaceable frame assembly according to the present invention.

With reference to FIG. 6, there is shown a third exploded view of the replaceable frame assembly according to the present invention. As FIG. 6 shows, the replaceable frame assembly 1 further comprises an adjustable fixation unit 1B, which comprises: a first plate 1B1, a connection plate 1B2, a second plate 1B4, and a fixation block 1B6, of which the connection plate 1B2 is connected with the second fixing unit (14a, 14b). Moreover, the first plate 1B1 is connected to the connection plate 1B2 by one side thereof, and is provided with two slot openings 1B3 thereon. On the other hand, the second plate 1B4 is provided with two screw holes 1B5 thereon, such that the second plate 1B4 is combined with the first plate 1B1 after making two threaded fasteners pass through said two slot openings 1B3 and then be screwed into said two screw holes 1B5, respectively. Moreover, the fixation block 1B6 is connected to the second plate 1B4, and has a receiving groove 1B7.

Figure 7A:
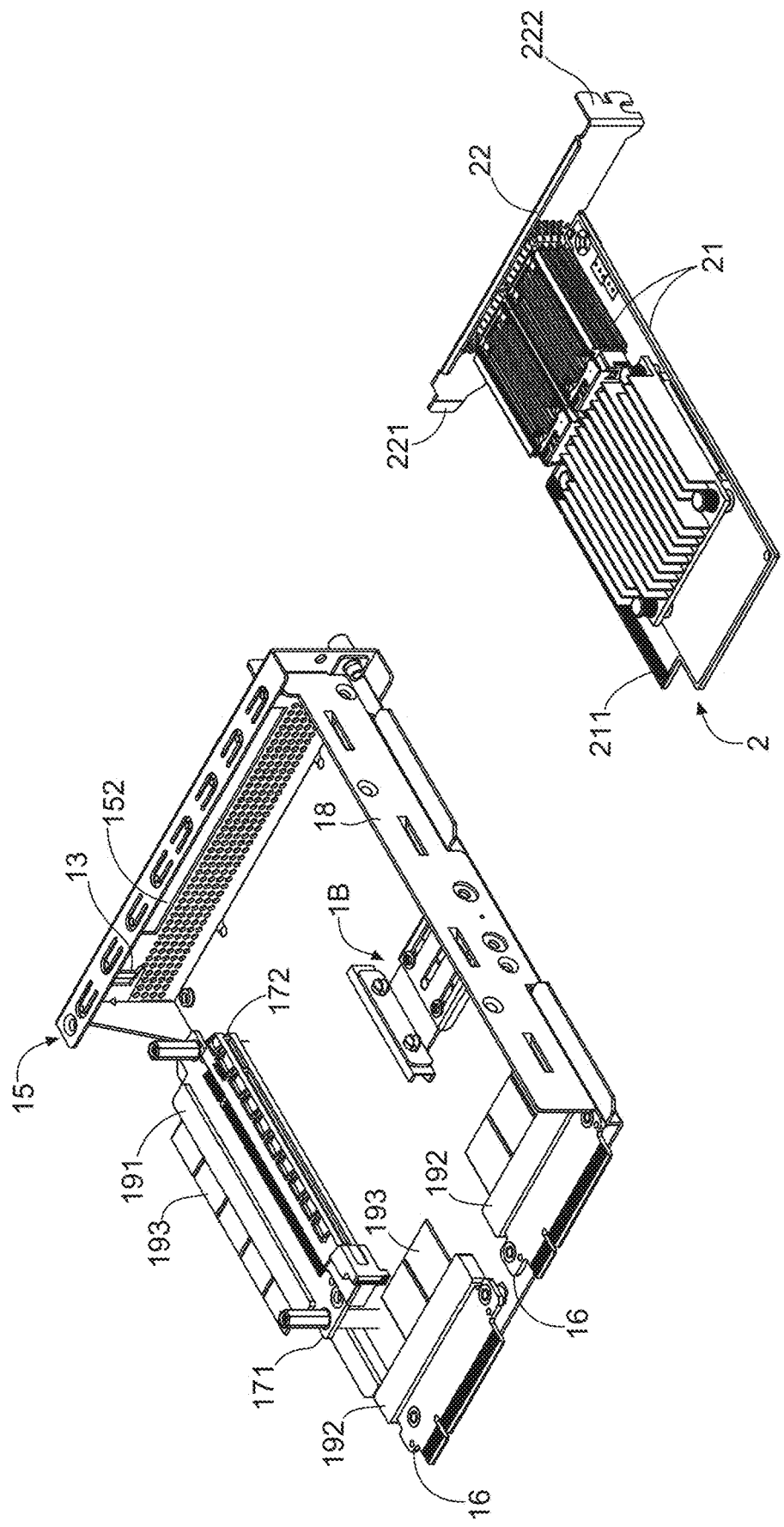
FIG. 7A shows a first stereo diagram of the replaceable frame assembly and the expansion card module.
Figure 7B:
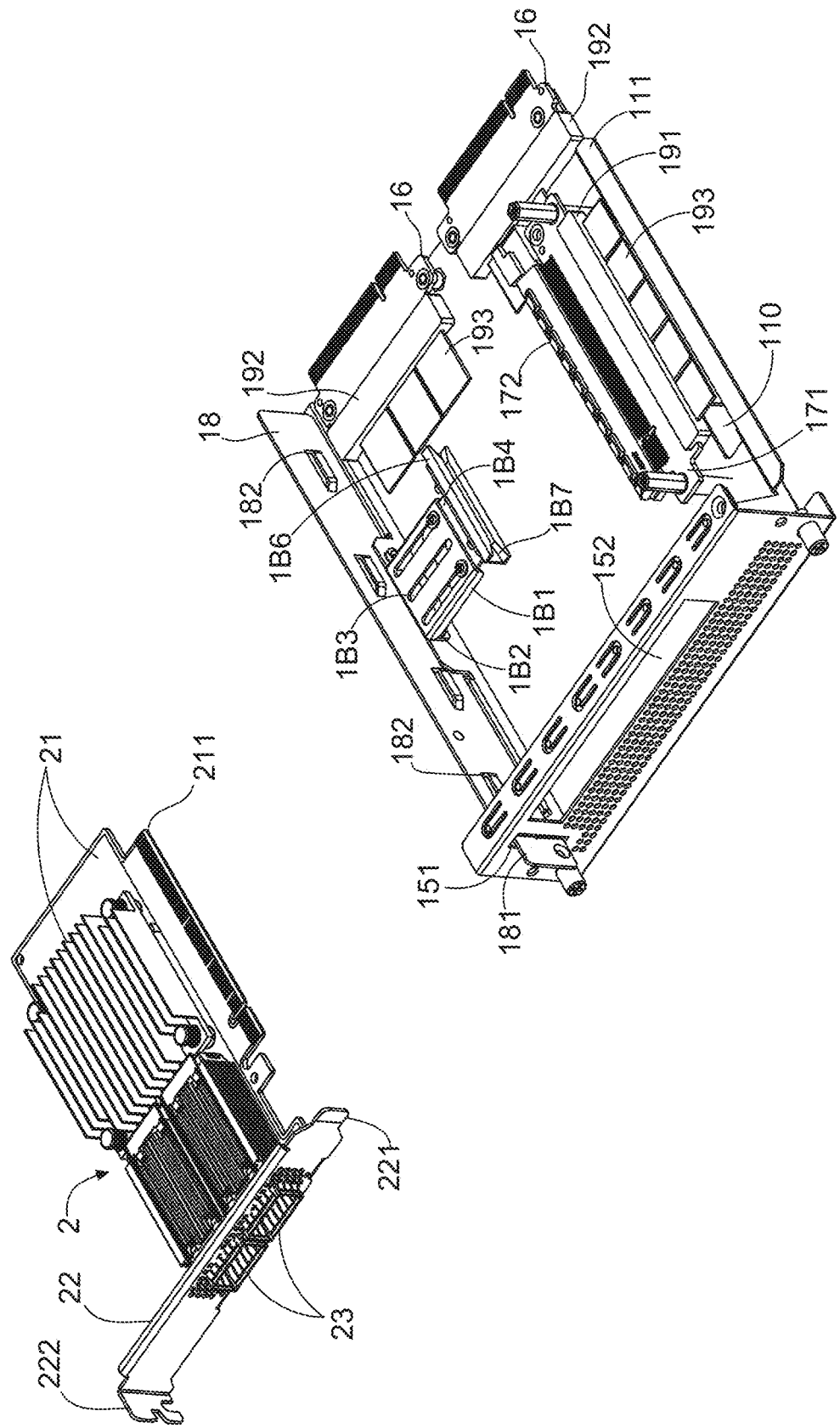
FIG. 7B shows a second stereo diagram of the replaceable frame assembly and the expansion card module.
Figure 8:
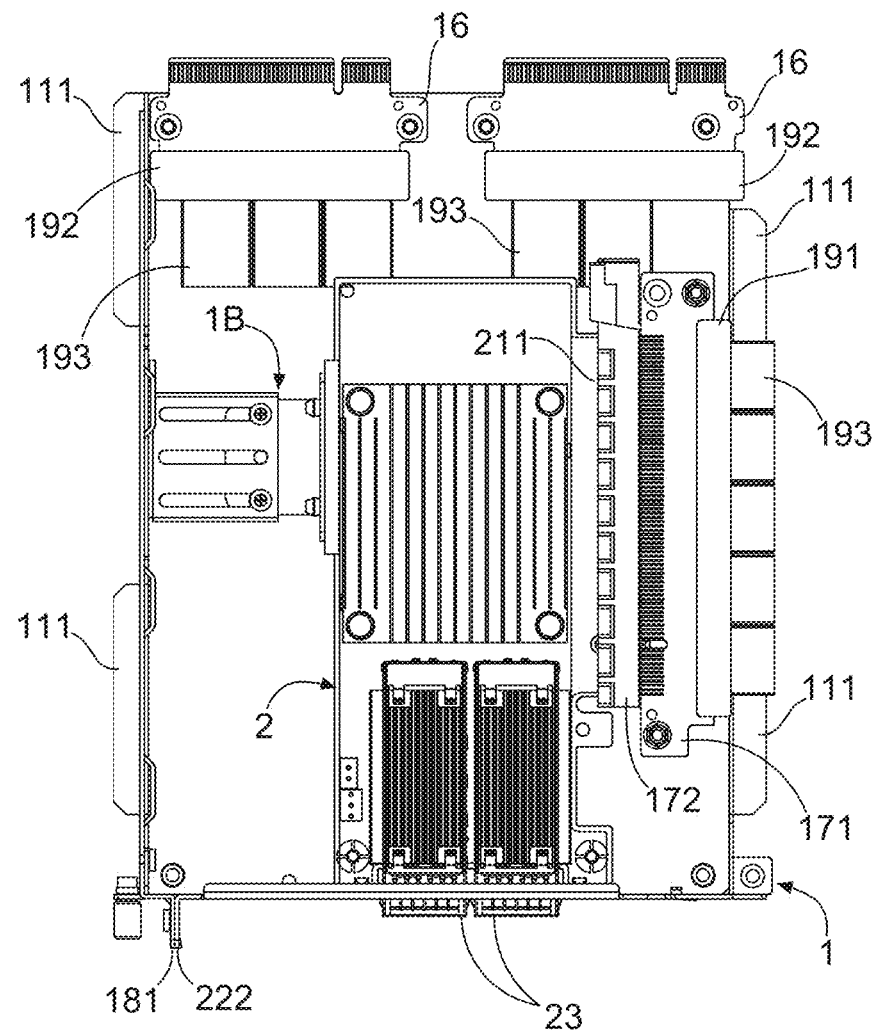
FIG. 8 shows a second top view of the replaceable frame assembly accommodating the expansion card module.

FIG. 7A and FIG. 7B show a first stereo diagram and a second stereo diagram of the replaceable frame assembly 1 and the expansion card module 2. Moreover, FIG. 8 illustrates a second view of the replaceable frame assembly 1 accommodating the expansion card module 2. As FIG. 7A, FIG. 7B and FIG. 8 show, after the expansion card module 2 is disposed on the base plate 11, the second plate 1B4 is allowed to be moved horizontally by pushing said threaded fastener to slide along said slot opening 1B3, so as to make a lateral side of the expansion card module 2 be embedded into the receiving groove 1B7 of the fixation block 1B6. Moreover, after the expansion card module 2 is embedded into the receiving groove 1B7 by one lateral side thereof, the second plate 1B4 is allowed to be fixed by screwing said threaded fastener tightly.

According to FIG. 6, FIG. 7A and FIG. 7B, there is further a second opening 152 formed on the front panel 15, and the mounting bracket 22 is provided with a third opening thereon, such that a signal transmission interface 23 of the expansion card module 2 is exposed out of the front panel 15 through the second opening 152 and the third opening.

Engineers skilled in computer science certainly know that, the expansion card module 2 shown in FIG. 5 is a Full-Height PCIe card, and the expansion card module 2 shown in FIG. 8 is a Low-Profile PCIe card. In conclusion, the replaceable frame assembly 1 of the present invention is adopted for accommodating any one type of PCIe card (i.e., expansion card module 2), and the replaceable frame assembly 1 is allowed to be inserted into a case 31 of the electronic device 3 through an insertion opening 311 that is formed on a front side of the case 31. After being disposed in the case 31, the replaceable frame assembly 1 electrically connected to a main board in the case 31, such that the expansion card module 2 (i.e., any one type of PCIe card) communicates with the main board, and therefore becomes a functional electronic module of the electronic device 3.

Therefore, through the above descriptions, all embodiments of the replaceable frame assembly according to the present invention have been introduced completely and clearly. It is worth emphasizing that, the above description is made on embodiments of the present invention. However, the embodiments are not intended to limit the scope of the present invention, and all equivalent implementations or alterations within the spirit of the present invention still fall within the scope of the present invention.

What is claimed is:

1. A replaceable frame assembly, comprising:
   a base plate;
   a first fixing unit, being disposed on a front side of the base plate, and comprising at least one front panel connecting members and a plug receiving member;
   a second fixing unit, being disposed on a first lateral side of the base plate, and comprising at least one fixation plate connecting members;
   a front panel, being connected to the front side of the base plate through the at least one front panel connecting members, and having a first opening;
   at least one first electrical connection interface, being disposed on the base plate, and being positioned near a rear side of the base plate;
   a second electrical connection interface, being disposed on the base plate, and being positioned near a second lateral side of the base plate;
   a third electrical connection interface, being connected between the second electrical connection interface and the at least one first electrical connection interface; and
   a fixation plate, being connected to the first lateral side of base plate through the at least one fixation plate connecting members, and there being a fixing member formed on a front side of the fixation plate, such that the fixing member passes through the first opening;
   wherein in case of an expansion card module consisting of a circuit board assembly and a mounting bracket being disposed on the base plate, an electrical connection member of the circuit board assembly being connected with the second electrical connection interface, thereby being further coupled to said first electrical connection interface through the second electrical connection interface and the third electrical connection interface;
   wherein a plug member of the mounting bracket being inserted into the plug receiving member, and a fastening member of the mounting bracket being exposed out of the front panel through the first opening, such that the fastening member and the fixing member are allowed to be attached to each other by a threaded fastener, thereby making the expansion card module be positioned on the base plate steadily.

2. The replaceable frame assembly of claim 1, wherein there are a plurality of propping members formed on one surface of the fixation plate, and the plurality of propping members prop against a side of the expansion card module after the fastening member and the fixing member are attached to each other by the threaded fastener.

3. The replaceable frame assembly of claim 1, wherein the front panel is further provided with at least one connecting portion thereon, such that the at least one connecting portion and the at least one front panel connecting members are allowed to be connected to each other by at least one fastener.

4. The replaceable frame assembly of claim 1, wherein there is further a second opening formed on the front panel, and the mounting bracket being provided with a third opening thereon, such that a signal transmission interface of the expansion card module is exposed out of the front panel through the second opening and the third opening.

5. The replaceable frame assembly of claim 1, wherein said first electrical connection interface is a first bridge board having a first electrical connection end and a second electrical connection end.

6. The replaceable frame assembly of claim 5, wherein in case of the replaceable frame assembly being integrated into a case of an electronic device, the second electrical connection end of said first electrical connection interface being received by an electrical connection slot of a main board in the case.

7. The replaceable frame assembly of claim 6, wherein the first lateral side and the second lateral side of the base plate are both connected with at least one edge plate, and there being a plurality of supporting members disposed on the base plate for supporting the second bridge board and the first bridge board.

8. The replaceable frame assembly of claim 7, wherein there is at least one spacer member disposed on the second bridge board, and the at least one spacer member and the fixation plate being allowed to be connected with a cover, such that the cover is positioned over the base plate to shield the expansion card module.

9. The replaceable frame assembly of claim 5, wherein the second electrical connection interface comprises a second bridge board having one electrical connection end and an electrical connection slot that is disposed on the second bridge board.

10. The replaceable frame assembly of claim 9, wherein the second lateral side of the base plate is formed with a notch thereon, and the third electrical connection interface comprising:
a first electrical connector, being connected with the electrical connection end of the second bridge board;
at least one second electrical connector, wherein said second electrical connector is connected with the first electrical connection end of the first bridge board; and
at least one ribbon cable, being connected between the at least one second electrical connector and the first electrical connector, and passing through the notch.

11. The replaceable frame assembly of claim 10, wherein a disposing number of said first electrical connection interface on the based plate is 1, such that the first electrical connection end and the second electrical connection end of the first bridge board and the electrical connection end of the second bridge board are all a PCIe-X16 gold finger, and the electrical connection slot being a PCIe-X16 slot.

12. The replaceable frame assembly of claim 10, wherein a disposing number of said first electrical connection interface on the based plate is 2, such that the first electrical connection end and the second electrical connection end of the first bridge board are both a PCIe-X8 gold finger, the electrical connection end of the second bridge board being a PCIe-X16 gold finger, and the electrical connection slot being a PCIe-X16 slot.

13. The replaceable frame assembly of claim 1, further compositing an adjustable fixation unit, comprising:
a connection plate, being connected with the second fixing unit;
a first plate, being connected to the connection plate by one side thereof, and being provided with at least one slot opening thereon;
a second plate, being provided with at least one screw hole thereon, such that the second plate is combined with the first plate after making a threaded fastener pass through said slot opening and then be screwed into said screw hole; and
a fixation block, being connected to the second plate, and having a receiving groove;
wherein after the expansion card module is disposed on the base plate, the second plate is allowed to be moved horizontally by pushing said threaded fastener to slide along said slot opening, so as to make a lateral side of the expansion card module be embedded into the receiving groove of the fixation block;
wherein after the expansion card module is embedded into the receiving groove by one lateral side thereof, the second plate being allowed to be fixed by screwing said threaded fastener tightly.

14. An electronic device, having a case accommodating a main board therein, and the case having an insertion opening; characterized in that the electronic device further has a replaceable frame assembly accommodating an expansion card module, and the replaceable frame assembly comprising:
a base plate;
a first fixing unit, being disposed on a front side of the base plate, and comprising at least one front panel connecting members and a plug receiving member;
a second fixing unit, being disposed on a first lateral side of the base plate, and comprising at least one fixation plate connecting members;
a front panel, being connected to the front side of the base plate through the at least one front panel connecting members, and having a first opening;
at least one first electrical connection interface, being disposed on the base plate, and being positioned near a rear side of the base plate;
a second electrical connection interface, being disposed on the base plate, and being positioned near a second lateral side of the base plate;
a third electrical connection interface, being connected between the second electrical connection interface and the at least one first electrical connection interface; and
a fixation plate, being connected to the first lateral side of base plate through the at least one fixation plate connecting members, and there being a fixing member formed on a front side of the fixation plate, such that the fixing member passes through the first opening;
wherein in case of an expansion card module consisting of a circuit board assembly and a mounting bracket being disposed on the base plate, an electrical connection member of the circuit board assembly being connected with the second electrical connection interface, thereby being further coupled to said first electrical connection interface through the second electrical connection interface and the third electrical connection interface;

wherein a plug member of the mounting bracket being inserted into the plug receiving member, and a fastening member of the mounting bracket being exposed out of the front panel through the first opening, such that the fastening member and the fixing member are allowed to be attached to each other by a threaded fastener, thereby making the expansion card module be positioned on the base plate steadily.

15. The electronic device of claim 14, wherein said electronic device is selected from a group consisting of desktop computer, server computer, single board computer, embedded system computer, industrial computer, in-vehicle infotainment system, security monitoring system, and gaming computer.

\* \* \* \* \*